Aug. 26, 1941.   T. B. MARTIN   2,253,716
CLUTCH
Original Filed Jan. 15, 1937   2 Sheets-Sheet 1

Witness:
Burr W. Jones

INVENTOR.
Thomas B. Martin
BY
Clinton S. James
ATTORNEY.

Aug. 26, 1941.   T. B. MARTIN   2,253,716
CLUTCH
Original Filed Jan. 15, 1937   2 Sheets-Sheet 2
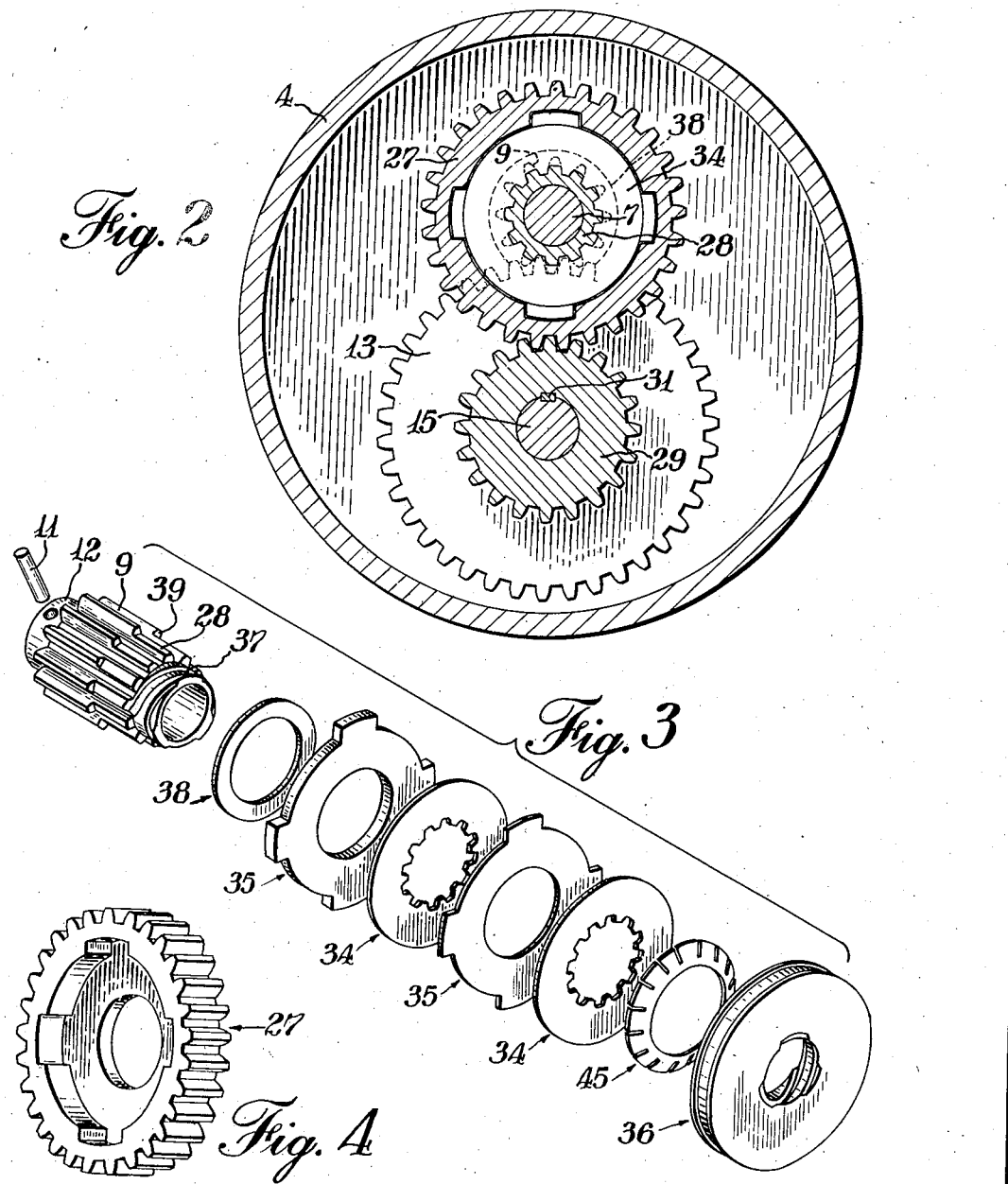

Patented Aug. 26, 1941

2,253,716

UNITED STATES PATENT OFFICE 2,253,716

CLUTCH

Thomas B. Martin, Ithaca, N. Y., assignor to Bendix Aviation Corporation, South Bend, Ind., a corporation of Delaware Original application January 15, 1937, Serial No. 120,700. Divided and this application June 10, 1939, Serial No. 278,531

4 Claims. (Cl. 192—47)

The present invention relates to clutches and more particularly to self-tightening or servo types of clutches.

The present application is a division of the application of Martin Serial Number 120,700, filed January 15, 1937, which application issued on August 1, 1939 as Patent Number 2,167,846.

It is an object of the present invention to provide a novel form of self-tightening clutch which is simple and rugged in construction while being efficient and reliable in operation.

It is another object to provide such a device in which the self-tightening action of the clutch may be automatically or semi-automatically controlled.

A further object of the invention is to provide such a device which is adapted to engage without shock, drive without slipping, and release without sticking.

Further objects and advantages will be apparent from the following description taken in connection with the accompanying drawings in which:

Fig. 2 is a section taken substantially on the line 2—2 of Fig. 1;

Fig. 3 is a detail in perspective showing the parts of the automatically controlled clutch in disassembled relation; and Fig. 4 is a perspective detail partly broken away of the driven member of the manually controlled clutch.

Figure 1:
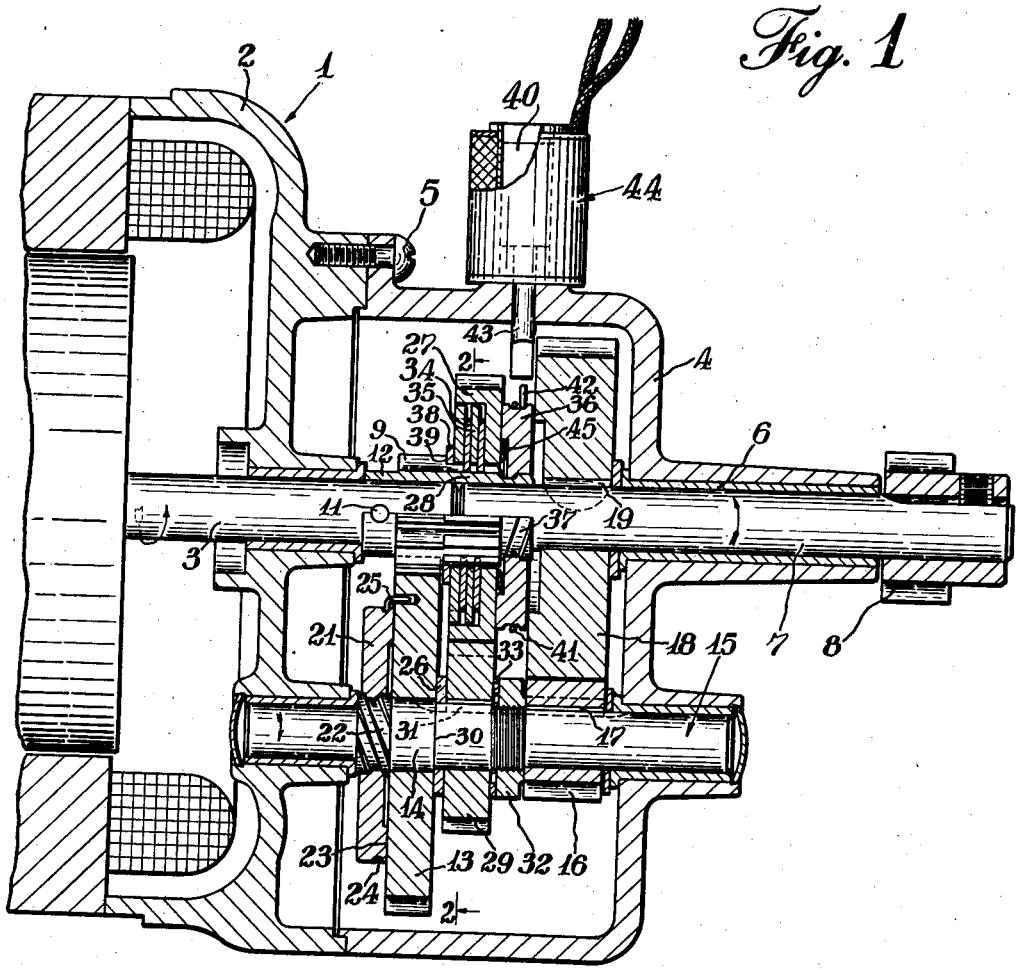
Fig. 1 is a vertical substantially mid-sectional view of a transmission incorporating an automatically controlled and a manually controlled clutch constituting a preferred embodiment of the present invention.

In Fig. 1 of the drawings, there is illustrated a driving motor 1 of conventional type comprising a casing 2 in which is journalled a drive shaft 3 extending axially therefrom. A gear housing 4 is mounted on the end of the motor casing by suitable means such as indicated at 5 and is provided with an axially extending bearing 6 in which is mounted a driven shaft 7 located substantially coaxial with the drive shaft 3. A pinion 8 or other suitable power take-off member is fixed on the extended end of the driven shaft 7 for the purpose of transmitting power therefrom to the apparatus, not illustrated, which it is desired to actuate.

Two trains of gearing are provided in the gear housing 4 for optionally connecting the drive shaft 3 to the driven shaft 7 at two different gear ratios. As here illustrated, the low gear train includes a pinion 9 mounted on the drive shaft 3 and fixed thereto in any suitable way as by means of a pin 11 traversing the drive shaft and the hub 12 of the pinion. A transmission member in the form of a low speed driven gear 13 is freely mounted on a smooth portion 14 of a lay shaft 15 journalled at its ends in the motor casing 2 and gear housing 4 in parallel relation beneath the driving shaft 3 and driven shaft 7 and is driven at low speed from driving shaft 3 through the low speed pinion 9 and transmission member 13. A pinion 16 is fixed on the lay shaft in any suitable manner as indicated at 17 and is arranged to mesh with a gear 18 keyed as indicated at 19 on the driven shaft 7.

Lay shaft 15 is driven at low speed from the driving shaft 3 through the low gear train comprising pinion 9 and transmission gear 13 by means of an overrunning clutch connection between gear 13 and shaft 15 comprising a clutch member in the form of a clamp nut 21 threaded on the lay shaft as shown at 22 and having a plane surface 23 arranged to frictionally engage and bind against the adjacent side of the transmission gear 13.

Means for controlling the action of the clamp nut 21 is provided in the form of a spring detent member 24 bearing frictionally on the periphery of said nut and non-rotatably connected in any suitable manner as indicated at 25 to the transmission gear member 13. The design of these parts, including the pitch and mean radius of the threaded connection 22 and the mean radii of the contacting surfaces of the nut and gear, is such that forward rotation of the transmission gear 13 causes the clutch member 21 to clamp said gear against a thrust washer 26 on the lay shaft 15 and thereby cause the gear to drive said shaft at low speed.

It will be understood that the engaging surfaces of the clutch member 21 and gear 13 may be roughened or serrated in any suitable manner in order to break down the oil film therebetween and/or render the clutch more positive in action if deemed desirable.

A high speed gear drive is provided between the drive shaft 3 and the lay shaft 15 including a drive gear 27 loosely mounted on the extended hub 28 of the drive pinion 9. The drive gear 27 is arranged to mesh with a driven pinion 29 keyed to the lay shaft 15 as indicated at 31. Pinion 29 is clamped against the thrust washer 26 which is seated against a shoulder 30 on the lay shaft, by means of a nut 32 threaded on said shaft. A lock washer 33 is preferably located between the nut 32 and gear 29 to prevent the nut from working loose.

Means subject to automatic or semi-automatic control for driving the high speed gear 27 from the drive pinion 9 is provided in the form of a friction clutch comprising discs 34 and 35 splined respectively to the hub of the pinion 9 and the interior of the gear 27. These clutch discs are arranged to be brought into frictional engagement by means of a control member in the form of a nut 36 threaded on the end of the driving pinion hub as indicated at 37 and arranged to clamp the discs against a thrust washer 38 bearing against a shoulder 39 formed on said pinion.

Means for controlling the clamping action of the clutch control nut 36 is provided in the form of a spring detent member 41 frictionally mounted on the periphery of said nut and normally rotatable therewith and having a terminal projection 42 extending radially in the plane of a detent member 43 slidably mounted in the gear housing 4. The detent 43 may be projected manually into the path of the projection 42 by pressure upon the end 40 thereof to arrest the rotation of the friction spring member 41, or may be actuated by a solenoid such as indicated at 44 which may be energized under manual or automatic control as desired.

The elements of the high speed clutch are so proportioned and arranged that when the friction spring member 41 is arrested in its movement by the detent 43, the retarding effect thereof will cause the control nut 36 to close the disc clutch and connect the drive gear 27 non-rotatably to the drive pinion 9 and consequently to the drive shaft 3. When the friction member 41 is released, however, the pressure of the control nut 36 against the clutch member is relaxed, and the gear 27 will be freed from the drive shaft 3. If desired, a dished spring member 45 may be interposed between the control nut 36 and the gear 27 in order to assist the relaxing motion of said nut.

It will be appreciated that inasmuch as the friction of the spring member 41 is a parasitic drag during high speed operation of the transmission, it is desirable to use as light pressure thereof as is consistent with reliable control of the transmission. One example of structure which has been found satisfactory in service comprises a thread of about one-half to three-quarters of an inch diameter and eighteen degrees to twenty degrees pitch, a friction surface of about one and one-quarter to one and one-half inches average diameter on the control nut, and a control torque of about two inch pounds.

In the operation of this device, when the motor 1 is energized while the detent 43 is in its retracted position as illustrated in Fig. 1, rotation of the drive shaft 3 is transmitted through pinion 9 to gear 13. Consequent rotation of the friction spring 24 causes the control nut 21 to clamp the gear 13 to the lay shaft 15, causing said lay shaft to rotate and operate the driven shaft 7 through pinion 16 and gear 18 whereby the pinion 8 is caused to drive the device to be operated at low speed.

When it is desired to operate the device at high speed, it is merely necessary to project the detent 43 into the path of the terminal 42 of the friction member 41. A retarding effect is thus imparted to the control nut 36 which consequently threads itself along the hub of pinion 9 into clamping engagement with the gear 27 and the high speed clutch elements. The relative speeds of rotation of the control nut and pinion hub are such that the friction between the gear and the face of the control nut assists the action of the friction member in closing the clutch. Gear 27 is thus caused to rotate with the drive shaft 3, driving the lay shaft through the pinion 29 and thus causing the driven shaft 7 to be operated at high speed. When it is desired to return to low speed, it is merely necessary to release the detent 43, whereupon the high speed clutch is automatically released, freeing the gear 27 from the drive shaft 3.

During the high speed operation of this device, the control nut 21 of the low speed clutch is backed away from the gear 13 by the overrunning action of the lay shaft. When the high speed clutch is released, however, the low speed clutch will automatically re-engage as previously described, and the low speed drive will be resumed.

Although but two forms of clutch embodying the invention have been shown and described in detail, it will be understood that other embodiments are possible and various changes may be made in the design and arrangement of the parts without departing from the spirit of the invention as defined in the claims appended hereto.

What is claimed is:

1. In a transmission mechanism, a driving member, a driven member and a disconnectable connection therebetween including a clutch member threaded to the driven member and arranged to have a frictional connection with the driving member, and a yielding element anchored to the driving member and bearing frictionally on the clutch member to thereby operate the threaded connection to close the clutch for transmitting rotation from the driving member to the driven member, and to open the clutch when the driven member overruns the driving member.

2. In a transmission mechanism, a driving member, a driven member, connecting means therefor including friction clutch elements connected respectively to said members, a control member having a threaded connection to the driving member such that retardation of the control member causes engagement of the clutch elements, a spring bearing frictionally on the control member and normally rotatable therewith, and manually operable means for arresting the rotation of the spring to thereby retard the control member and cause engagement of the clutch elements.

3. In a transmission mechanism, a driving member, a driven member and a disconnectable connection therebetween including a clutch member threaded to one of said members and arranged to frictionally engage the other member, and means including a coiled spring member bearing frictionally on the clutch member and adapted to be wound down on the same to apply torque thereto in a direction to cause the clutch member to thread itself into frictional engagement with said other member.

4. A self-tightening clutch including a screw sleeve, a clutch member threaded thereon, a second clutch member frictionally engaging the first clutch member and rotatably but non-slidably mounted with respect to the screw sleeve, and a self-tightening coiled spring detent mounted to rotate with one of said clutch members and frictionally connected to the other clutch member to control the engagement of the clutch members.

THOMAS B. MARTIN.